United States Patent [19]

Segal et al.

[11] Patent Number: 4,697,262

[45] Date of Patent: Sep. 29, 1987

[54] DIGITAL CARRIER CHANNEL BUS INTERFACE MODULE FOR A MULTIPLEXER HAVING A CROSS-CONNECT BUS SYSTEM

[75] Inventors: Henry P. Segal, Ridgefield, Conn.; Carl A. DeWilde, Stony Brook, N.Y.

[73] Assignee: Siemens Aktiengesellschaft, Berlin & Munich, Fed. Rep. of Germany

[21] Appl. No.: 758,990

[22] Filed: Jul. 25, 1985

Related U.S. Application Data

[63] Continuation-in-part of Ser. No. 683,901, Dec. 20, 1984.

[51] Int. Cl.[4] ............................ H04J 3/22; H04J 3/12
[52] U.S. Cl. ...................................... 370/84; 370/85; 370/111
[58] Field of Search ................ 370/87, 89, 94, 77, 370/85, 95, 102, 111, 105

[56] References Cited

U.S. PATENT DOCUMENTS

| | | | |
|---|---|---|---|
| 4,383,315 | 5/1983 | Jorng | 370/89 |
| 4,536,872 | 8/1985 | Lahti | 370/84 |
| 4,566,095 | 1/1986 | Devault et al. | 370/94 |
| 4,578,797 | 3/1986 | Satoh et al. | 370/84 |

OTHER PUBLICATIONS

Digital Access and Cross-Connect System—System Architecture R. P. Abbott and D. C. Koehler, pp. B1,2.1–B1.2.7.
DACS Features and Applications, J. R. Colton and A. J. Osofsky; pp. B1.1.1–B1.1.7.
DACS Microprocessor System, A. J. Cirillo, L. F. Horney II, J. D. Moore; pp. B1.2.1–B1.2.6.
DACS in an Associated Company, L. C. Sweeney; pp. B1.4.1–B1.4.3.

Primary Examiner—Douglas W. Olms
Assistant Examiner—Curtis A. Kuntz
Attorney, Agent, or Firm—Jeffrey P. Morris

[57] ABSTRACT

A digital carrier channel bus interface module is disclosed for a multiplexer having a cross-connect bus system. Random access memory is loaded or unloaded by a serial-to-parallel or parallel-to-serial converter respectively with data in parallel format off a digital carrier line. A high speed digital carrier module controls high speed data transmission over the bus system to another digital carrier channel. Receive and transmit addresses are sequentially routed over receive and transmit address bus lines of the bus system so that bus drivers and bus receivers of the channel bus interface module may appropriately actuate the routing of data in parallel over the bus system.

4 Claims, 15 Drawing Figures

DIGITAL CARRIER CHANNEL BUS INTERFACE MODULE FOR A MULTIPLEXER HAVING A CROSS-CONNECT BUS SYSTEM

This is a continuation-in-part of application Ser. No. 683,901 filed on Dec. 20, 1984.

BACKGROUND OF THE INVENTION

1. Technical Field

The present invention relates to a digital carrier multiplexer having a cross connect capability and, more particularly, a bus interface module which operates to permit cross connection of digital carrier and, in particular, pulse code modulated (PCM) channels at the DS0 T carrier hierarchical level of digital transmission.

2. Description of the Prior Art

The standard for digital carrier multiplexers operating to multiplex digital DS1, DS1C and DS2 T carrier transmission lines into a DS3 transmission line is set forth and discussed in the *Bell System Transmission Engineering Technical Reference* entitled "Digital Multiplexes, Requirements and Objectives" by the Director, Exchange Systems Design, AT&T (July, 1982). Digital multiplexers which are connected into the Bell System pulse code modulated T carrier telecommunications network must conform with this standard.

As is well known, a single PCM channel, known as a "DS0" channel, operates at 64 kilobits per second (Kb/sec) in each direction of transmission to transmit and receive 8,000 8-bit samples per second of a desired telecommunication, be it voice or data. According to the Bell standard, individual two way channels are multiplexed into higher speed channels for long distance transmission. As a particular example, 24 DS0 channels may be multiplexed into a "DS1" channel or hierarchical level operating at 1.544 Mb/sec. In this format, 24 8-bit samples, one from each DS0 channel, are arranged serially in a single transmission frame together with a single framing bit to form a 193-bit frame. Transmission of successive 193-bit frames at a rate of 8,000 frames per second determines the bit rate of 1.544 Mb/sec. Set forth in the following table are the Bell standard digital transmission lines or hierarchical levels with their associated transmission rates and numbers of channels:

TABLE

| Transmission Line | Number of Voice Channels | Transmission Rate |
|---|---|---|
| DS0 | 1 | 64 Kb/sec. |
| DS1 | 24 | Approx. 1.5 Mb/sec. |
| DS1C | 48 | Approx. 3 Mb/sec. |
| DS2 | 96 | Approx. 6 Mb/sec. |
| DS3 | 672 | Approx. 45 Mb/sec. |

A so-called "M13" multiplexer, for example, is known which multiplexes 28 DS1 transmission lines into a single DS3 transmission line. This is accomplished by providing seven M12 multiplexers, each of which multiplexes four DS1 lines into a single DS2 line, and providing a single M23 multiplexer which multiplexes seven DS2 lines into a single DS3 line.

Additional flexibility is provided by a so-called "MX3" multiplexer. The MX3 multiplexer is capable of connecting different numbers of DS1, DS1C, and DS2 lines to a single DS3 line. For example, seven DS2 lines connected to the M23 multiplexer are formed by concentrating one group of four DS1 lines, concentrating one group of two DS1C lines or by direct connection of a DS2 line. As will be appreciated, the "X" in the MX3 multiplexer designation refers to the fact that three different types of transmission types of transmission lines—namely DS1, DS1C, and DS2—are connectable to this device.

A more recent known development is a complete switching "node" which connects a variable number of DS1, and DS1C, lines as inputs and outputs and routes any voice channel on any one line to a voice channel on another line. This is accomplished with the aid of a digital cross-connect system (DCS) which operates in the manner of a telephone exchange to connect any incoming transmission line to any outgoing transmission line. One such digital cross-connect system is currently marketed by AT&T Technologies, Inc. under the acronym "DACS" (Digital Access and Cross-Connect System). This known cross-connect system provides a crosspoint array to enable any DS1 or DS1C transmission line of one transmission rate to be connected to another DS1 or DS1C transmission line. The system is unable to perform multiplexing at the DS2 or DS3 level.

However, separate conversion from one transmission rate to another may be effected by a plurality of separate MX3 multiplexers. Furthermore, M12 and MC2 multiplexers may also be provided, as desired, to convert to a DS2 transmission rate.

While multiplexing equipment of this type may be tailored to voice transmission network nodes of a particular configuration, such multiplexing equipment is not readily programmable so that changes in the node configuration are expensive and time consuming. This known equipment includes dedicated multiplexer hardware which must be physically interconnected into or removed from the system each time a change is made.

In co-pending U.S. patent application, Ser. No. 683,901, filed Dec. 20, 1984 by the present inventors, there is disclosed a "Digital Multiplexer for PCM Voice Channels Having a Cross-Connect Capability". Specifically, the cross-connect capability comprises a bus system providing parallel data transmission among low and high speed modules, the low and high speed transmission data being converted from a serial to parallel format for bus transmission while each module is provided with means to provide an appropriate hierarchical serial output.

SUMMARY OF THE INVENTION

It is the object of the present invention to provide apparatus for interconnecting a plurality of digital transmission lines having different transmission rates which is readily programmable and therefore easily modifiable so as to change the node configuration.

It is a further object of the present invention to provide apparatus of the above described type which is capable of both rerouting PCM channels as well as concentrating or dispersing PCM channels to or from high speed (DS3) transmission lines respectively.

It is still a further object of the present invention to provide apparatus permitting interconnection and multiplexing capability at the DS0 hierachical channel level so that samples provides by a particular channel may be multiplexed or cross-connected to any other channel.

It is yet a further object to provide apparatus of the above described type in modular form and comprising CMOS integrated circuiry, the result being an economical, viable, efficient product having inherent expansion capability.

These objects, as well as other objects which will become apparent from the discussion that follows, are achieved, according to the present invention, by providing a system of the following configuration:

On one side of the system are a number of terminals for connection to the low speed transmission lines. These terminals may be divided into "first terminals" adapted for connection to the incoming branch lines of the low speed (DSO, DS1, DS1C, DS2), duplex PCM highways and "second terminals" adapted for connection to the outgoing branch lines of the respective low speed, duplex PCM highways. On the opposite side of a bus system are a second set of terminals for connection to the high speed transmission lines. These terminals may be divided into "third terminals" adapted for connection to the incoming branch lines of the respective high speed (DS3), duplex PCM highways and "fourth terminals" adapted for connection to the outgoing branch lines of the respective high speed, duplex PCM highways.

A bus system is arranged within the system for routing both digital data (8 bit samples) and destination or origination addresses throughout the system. The bus includes a number of bus lines for transmission of data, half of which are denominated "transmitting bus data lines" and the other half of which are denominated "receiving bus data lines". Additional bus lines are used for transmitting addresses throughout the system. Half of these additional lines, denominated "transmitting bus address lines" are associated with the transmitting bus data lines. The other half of these additional lines, denominated "receiving bus address lines" are associated with the receiving bus data lines. Both the bus data lines and the bus address lines are grouped into "sets" for parallel transmission of data (voice samples or data) and addresses. Such an embodiment provides an improvement in efficiency and speed over known systems and permits improved accuracy since transmission may be parity-checked.

Also included in the system are a number of "low speed modules". Each low speed module couples at least one of the aforementioned first terminals to each set of the transmitting bus data lines and couples at least one of the aforementioned second terminals to each set of the receiving bus data lines. Each low speed module is also connected to the transmitting bus address lines and to the receiving bus address lines.

A still further object of the present invention is to provide a particular low speed module which interfaces with the bus system at the DSO pulse code modulated channel level. The DSO low speed module, comprising a small random access memory for temporary data storage, permits a particular DSO hierarchical transfer of data to another DSO channel output in the same or another module, all under the control of a specially designed high speed module.

Each high speed module couples a single one of the aforementioned third terminals to a set of the receiving bus data lines and couples a single one of the aforementioned fourth terminals to a set of the transmitting bus data lines. Each high speed module is also connected to a set of the transmitting bus address lines and to a set of the receiving bus address lines.

The bus system operates to route each PCM sample received on any channel at a first or third terminal to any other PCM channel for outgoing transmission at a second or fourth terminal. This routing is accomplished by programming the high speed modules to apply an address to a corresponding transmitting and receiving bus address line set at the same time that a PCM sample is applied to a transmitting or receiving data line set. This address designates either the originating or recipient module plus the time slot in the originating or destination PCM highway. Since each of the low-speed modules monitors all of the data and address buses, that low speed module connected to the destination PCM highway will receive, store and subsequently transmit the PCM sample in the proper time slot.

The system is preferably constructed in plug-in modular form, the modules comprising compact CMOS integrated circuit chips. One embodiment of the plug-in modules plugs into the bus system in such a way as to permit the bus system's expansion to a second or multiple systems, simultaneously expanding the cross-connect and multiplexing capabilities of the present invention.

Other features and advantages of the invention will be apparent from the following description of the preferred embodiment, and from the claims. For a full understanding of the present invention, reference should now be made to the following detailed description of the preferred embodiment and to the accompanying drawings.

DESCRIPTION OF THE PREFERRED EMBODIMENT

Figure 1:
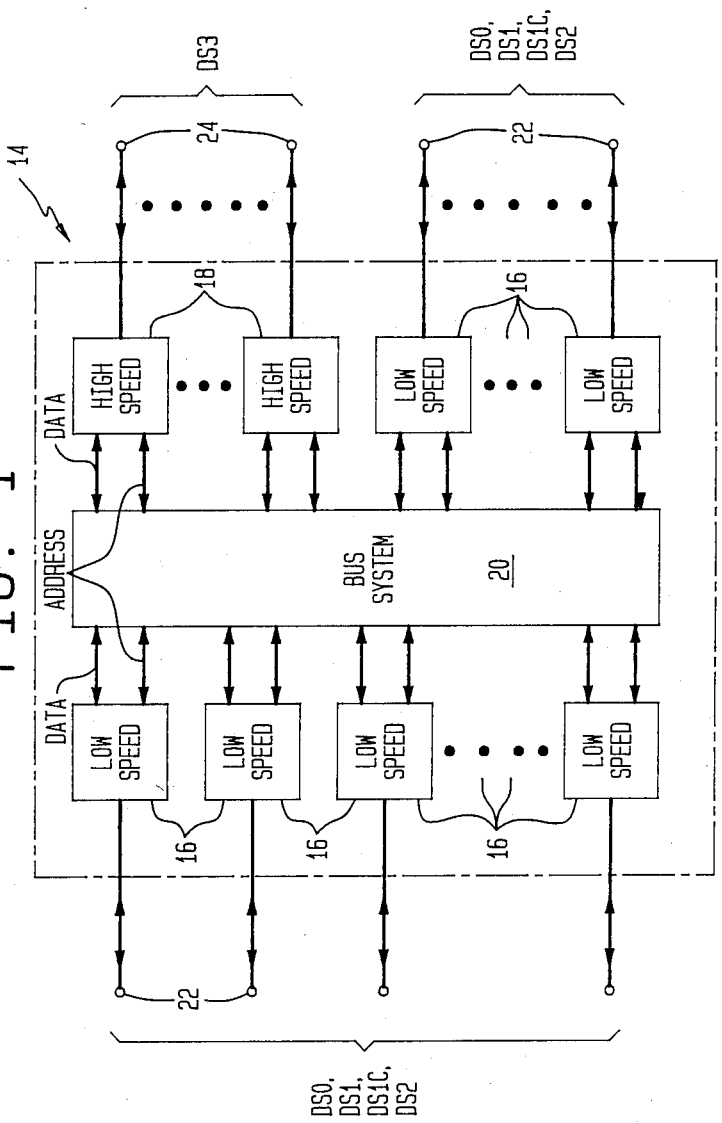
FIG. 1 is an overall schematic block diagram of apparatus according to the invention for both rerouting and concentrating (dispersing) digital carrier channels.

The preferred embodiment of the present invention will now be described with reference to FIGS. 1-13 of the drawings. Identical elements in the various figures are designated by the same reference numerals.

FIG. 1 illustrates the general concept of the present invention in a manner which can be compared to the conventional DACS rerouting and concentrating system. As shown in FIG. 1, the apparatus 14 comprises a number of low speed modules 16 and a number of high speed modules 18 all connected to a common bus system 20. The low speed modules are connected to input/output terminals 22 which are adapted for connection to low speed transmission lines (DSO, DS1, DS1C, and DS2). The high speed modules 18 are connected to input/output terminals 24 which are adapted for connection to DS3 transmission lines. Both the low speed and high speed modules separate the individual POM channels or 8 bit samples from the respective incoming PCM highway branches and supply each PCM 8 bit sample or data byte to the bus system together with a destination address. Since all modules are connected to and monitor the signals appearing on the bus system, the transmitted sample is received and accepted by the module which handles the designated address. This module, in turn, places the sample in the proper time slot and passes it to its associated output terminal. The address for each sample thus comprises both space and time information which is interpreted by all modules to place this sample on the proper transmission line in the proper time slot.

Thus, it can be seen from this preliminary overview that the present invention comprises both flexible cross-connect and inherent multiplexing capability in comparison with the relatively rigid cross-connect field and separate hard-wired multiplexers of the prior art.

Figure 2:
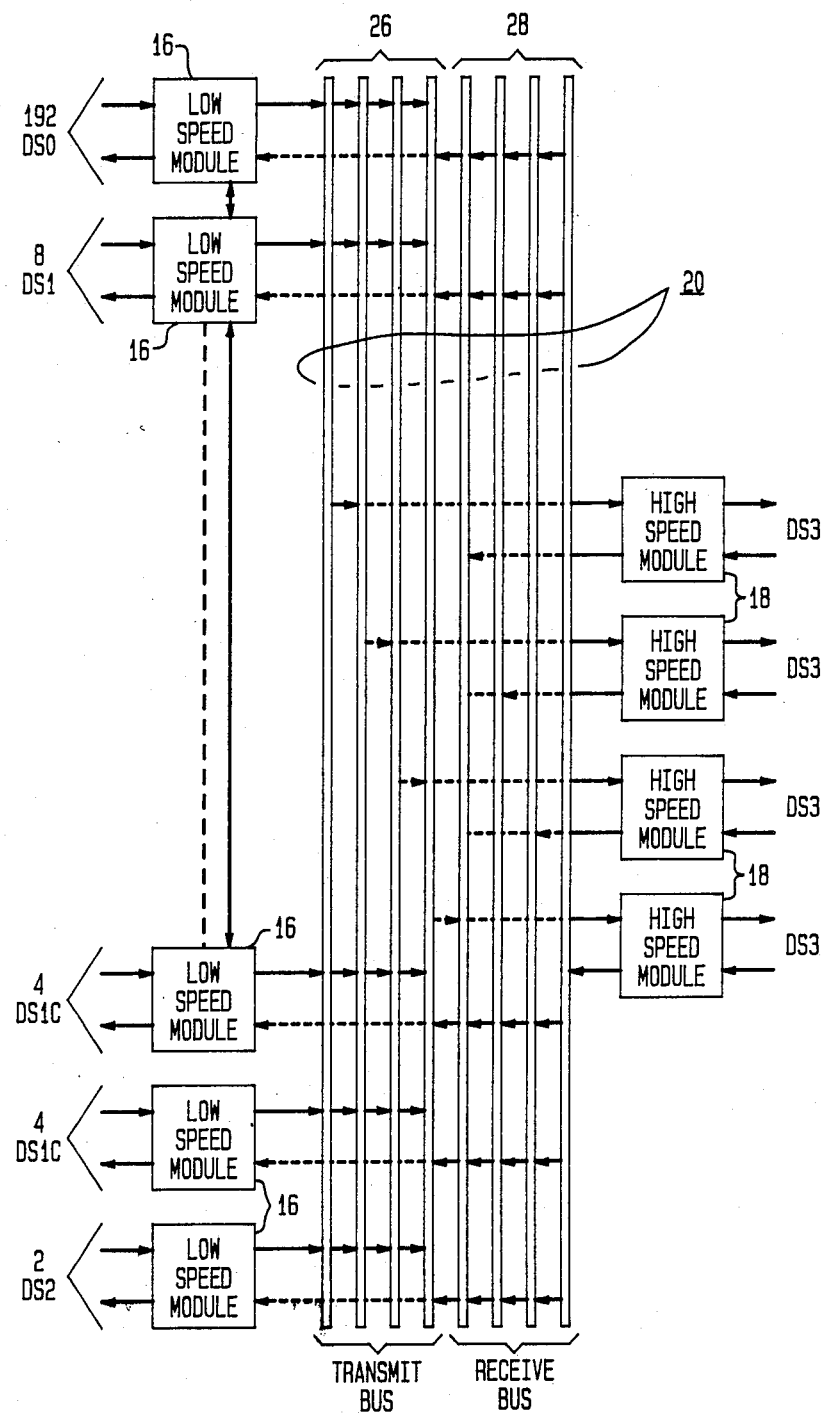
FIG. 2 is a detailed schematic block diagram of apparatus according to the preferred embodiment of the present invention, for rerouting and concentrating (dispersing) digital carrier channels.

FIG. 2 depicts a particular implementation of the inventive concept illustrated in FIG. 1. In FIG. 2, all of the low speed modules are arranged on the same (left) side of the bus system 20 leaving all high speed modules on the same (right) side of the bus system. It will be appreciated that this arrangement in no way differs from the arrangement shown in FIG. 1 since both arrangements allow any PCM channel on one transmission line to be routed to any other transmission line, no matter what the transmission rate of the destination transmission line may be.

It will be noted that the bus system 20 is divided into transmit bus lines 26 and receive bus lines 28. A transmit bus couples the output of each low speed module to the input of each high speed module. Similarly, a receive bus couples the output of each high speed module to the inputs of all of the low speed modules. There are four transmit buses and four receive buses for a maximum of four possible high speed modules in the depicted embodiment.

Each transmit bus and receive bus comprises two bus line sets: one for data (PCM 8 bit samples or data bytes) and one for address information. There are therefore four types of bus lines: (1) transmitting bus data lines; (2) transmitting bus address lines; (3) receiving bus data lines; and (4) receiving bus address lines.

Figure 6A:
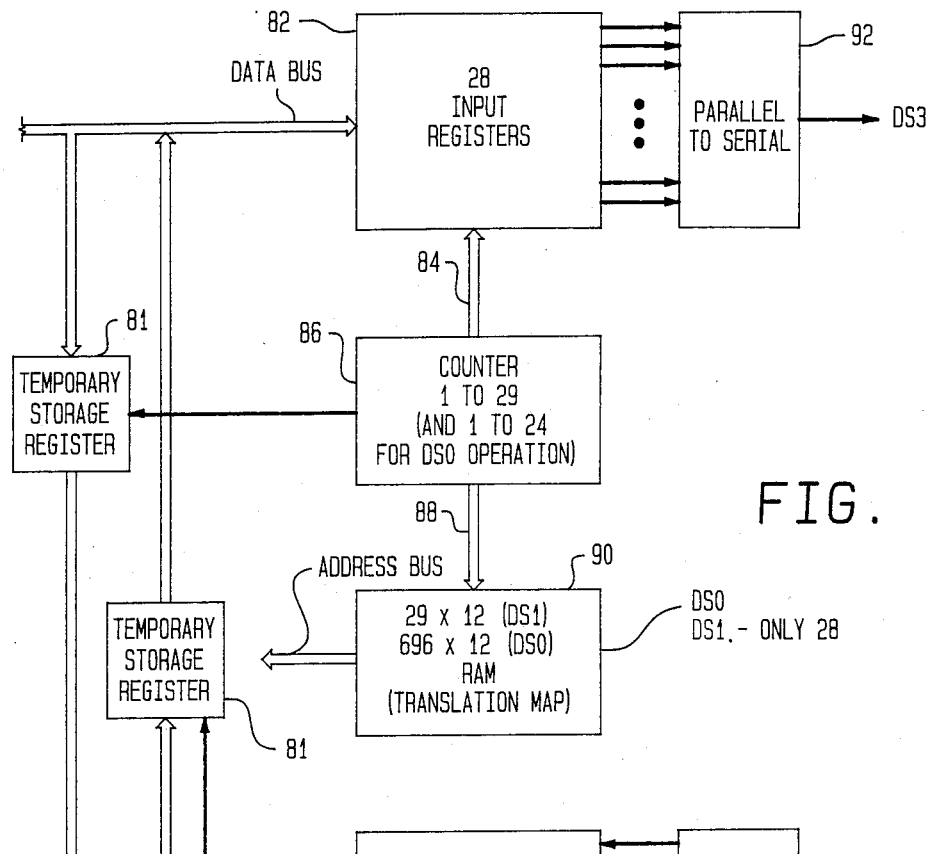
FIGS. 6A and 6B are schematic block diagrams illustrating the internal operation of a high speed module for transmitting and receiving PCM voice channels on a duplex DS3 line.

As noted above, each DS3 signal is capable of accomodating 28 DS1 signals. Referring briefly to FIG. 6A, the input of each high speed module is therefore connected to 28 input registers 82 which are activated one after the other in 28 of a possible 29 cyclically repeated time slots. When in the activated or enabled condition, each input register receives data transmitted on one of the four transmitting bus data lines. The 28 input registers are enabled by a continuously running counter 86 within the respective high speed module.

The data portion of each transmit and receive bus constitutes 8 wires. The 8-bit samples are thus transmitted (or received) on the transmit (or receive) buses. A 12 bit address is prepared for transmission from translation map 90 over the address bus. An individual and select line is employed to select 1 of 16 low speed modules or plug-in cards. Three address bits identify one of eight multiplex/demultiplex sections of the card and five bits identify channel data. Each high speed module then can address one out of up to 128 possible DS1 locations (1 out of 8 sections of up to 16 low speed modules).

By transmitting the appropriate address on one of the address buses, the data of a particular section (1 out of 8) of the addressed low speed module (1 out of 16) is applied to the data transmit bus. By transmitting the appropriate address on one of the four address buses in the time slot in question, the high speed module activates the transmittal of the addressed data via the associated data transmit bus to the appropriate input register of the associated high speed module.

The apparatus is controlled by writing addresses (1 per input register of a low or high speed module) in four memories, each with at least 28 memory locations, (a 29th memory location being storage for an extra time slot for performing certain features hereinafter described.) The contents of the memory locations of each memory are applied sequentially for the duration of one time slot via code conversion logic circuitry to the address bus and thus determines for each time slot which 8-bit sample will be transmitted from a low speed module via the associated transmit data bus line. Since the time slot and transmit bus are permanently assigned to a particular high speed module, the addresses in the memory locations designate the destination high speed module and D3 transmission line.

Each data bus line transmits, time interleaved (time division multiplexed), at least 28 and preferably 29 as hereinafter described DS1 signals. The clock frequency of the bus must therefore be at least 1,544 MHz $\times$ 29 = 45 MHz. Since this is too fast for conventional HCMOS logic, the digital signals are supplied to the bus parallel in each time slot. The clock frequency of the bus need therefore be only above 6 MHz.

A DS1C signal is separated into two DS1 signals and then connected through in the manner described above.

Figure 3:
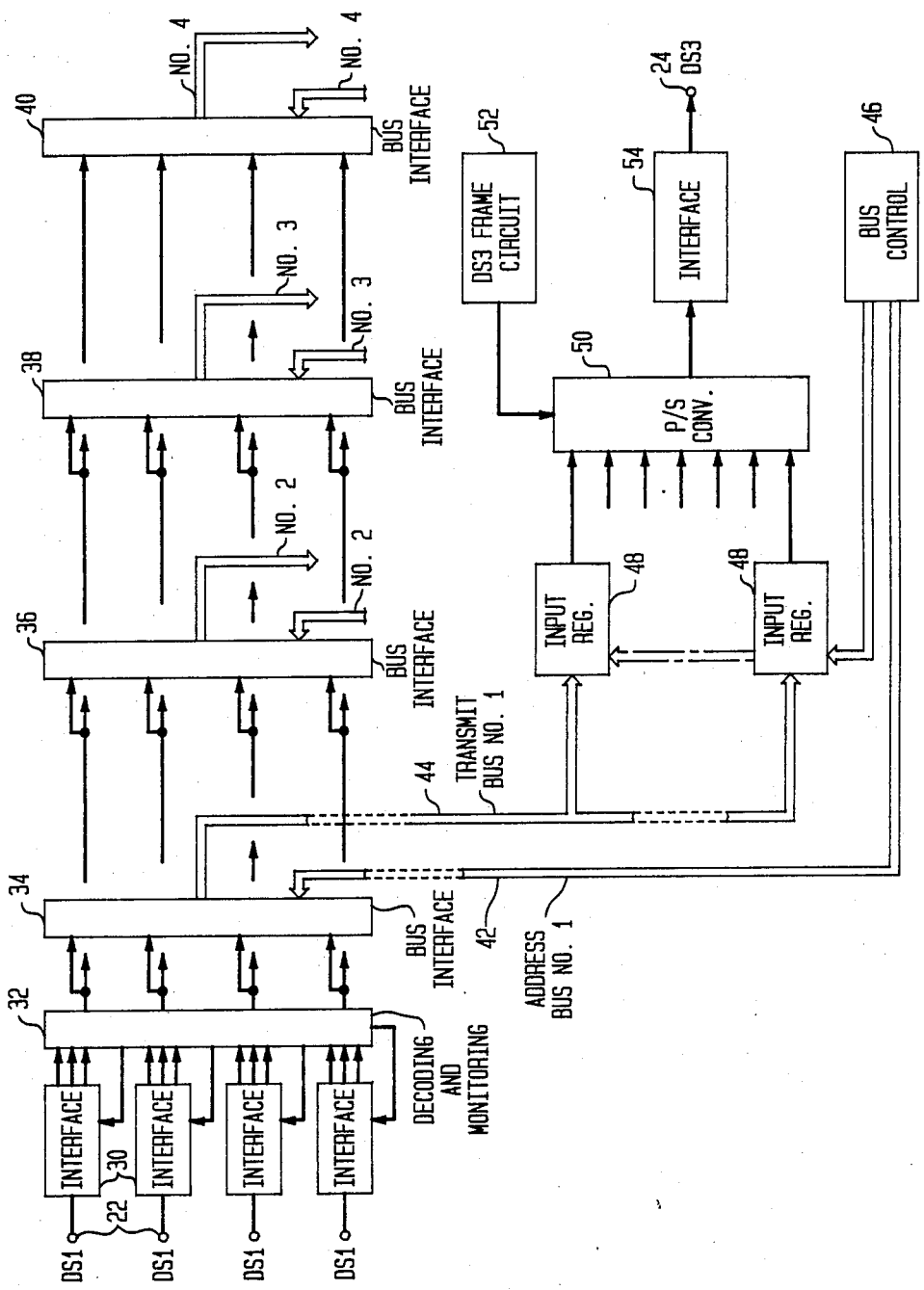
FIG. 3 is a detailed schematic block diagram showing how digital carrier channels on four DS1 lines are routed to and concentrated for transmission on one DS3 line.
Figure 4:
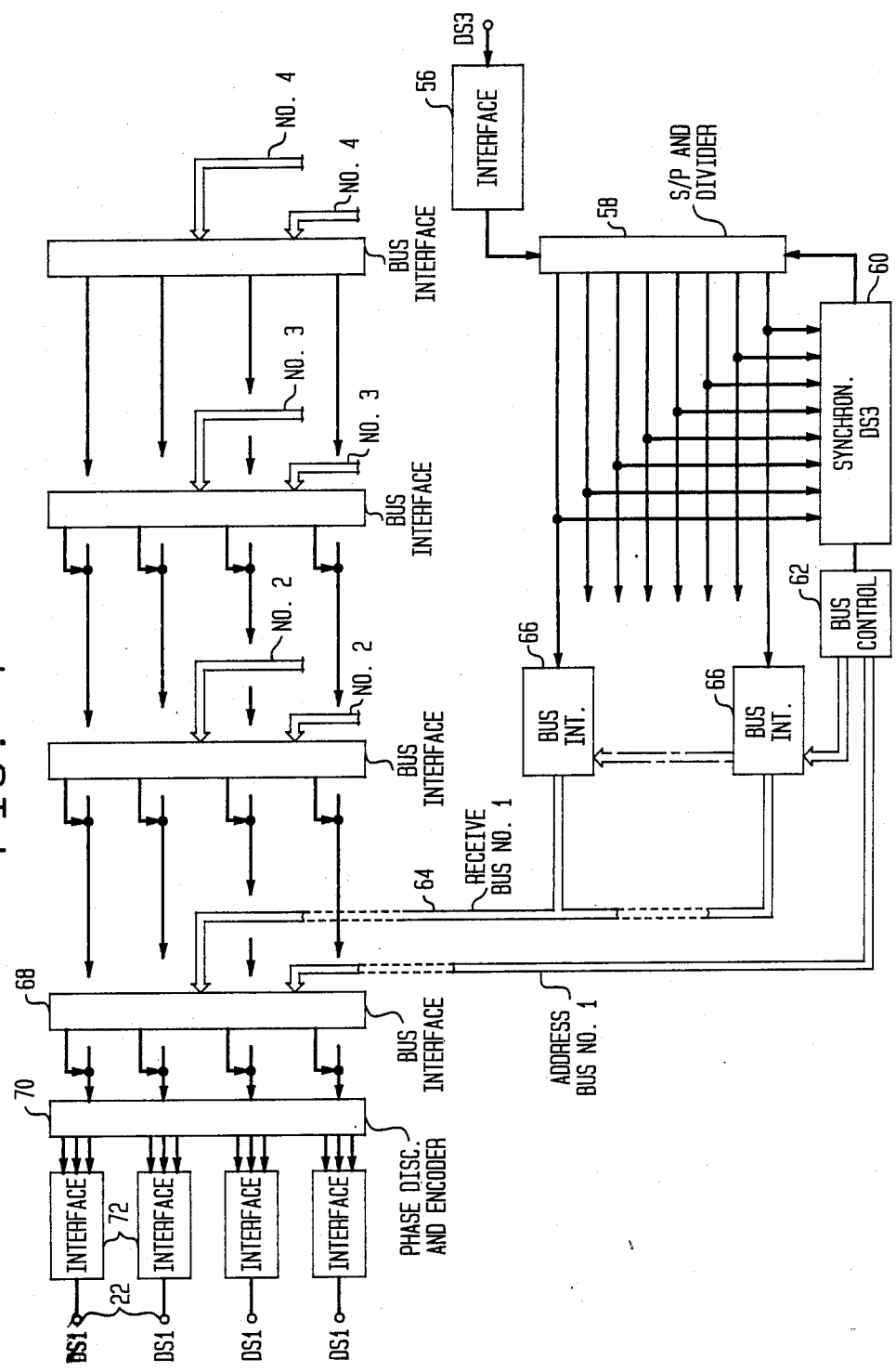
FIG. 4 is a schematic block diagram showing how digital carrier channels on one DS3 line are routed to and distributed for transmission on four DS1 lines.

FIGS. 3 and 4 illustrate the bus interconnection between a low speed module and a high speed module. FIG. 3 shows how incoming branches of DS1 transmission lines are connected to an outgoing branch of a DS3 line. FIG. 4 illustrates the complimentary situation wherein the incoming branch of a DS3 line is directed to the outgoing branches of four DS1 lines.

Referring to FIG. 3, each DS1 terminal 22 supplies a DS1 signal to a line interface circuit 30 which passes an output to a decoding and monitoring circuit 32. Signals are made available from the circuit 32 to four bus interface circuits 34, 36, 38 and 40. Each bus interface circuit responds to a source address received on a respective address bus 42 and supplies an 8-bit sample on its associated transmit bus 44. A bus control circuit 46, which generates the addresses for a high speed module, also designates one of the input registers 48 of this module to receive the sample. As data is collected in the input registers 48, it is made available through a parallel-to-serial converter and multiplexer 50 that is controlled by a DS3 framing circuit 52. A serial signal is supplied from the circuit 50 to a line interface circuit 54, and from there to the output terminal 24.

Similarly, as shown in FIG. 4, an incoming DS3 signal is passed through an interface 56 to a serial-to-parallel converter 58. This circuit 58 supplies signals to a synchronizer 60 which synchronizes to the frame of the DS3 signal. A bus control circuit 62, timed by the synchronizer 60, selects the samples which are placed on the receive bus 64 by the bus interface and buffer circuits 66. Simultaneously, the bus control circuit supplies a destination address to the bus interface circuit 68 of all low speed modules connected to that bus. A module selector selects the proper low speed module. The address selects the proper DS1 line connected to that low speed module and the proper 1 of 24 channel time slot in the selected DS1 line for transmission. The sample is then passed through a phase discriminator and encoder 70 and an interface circuit 72 to the output terminal 22 for the selected DS1 line.

Figure 5:
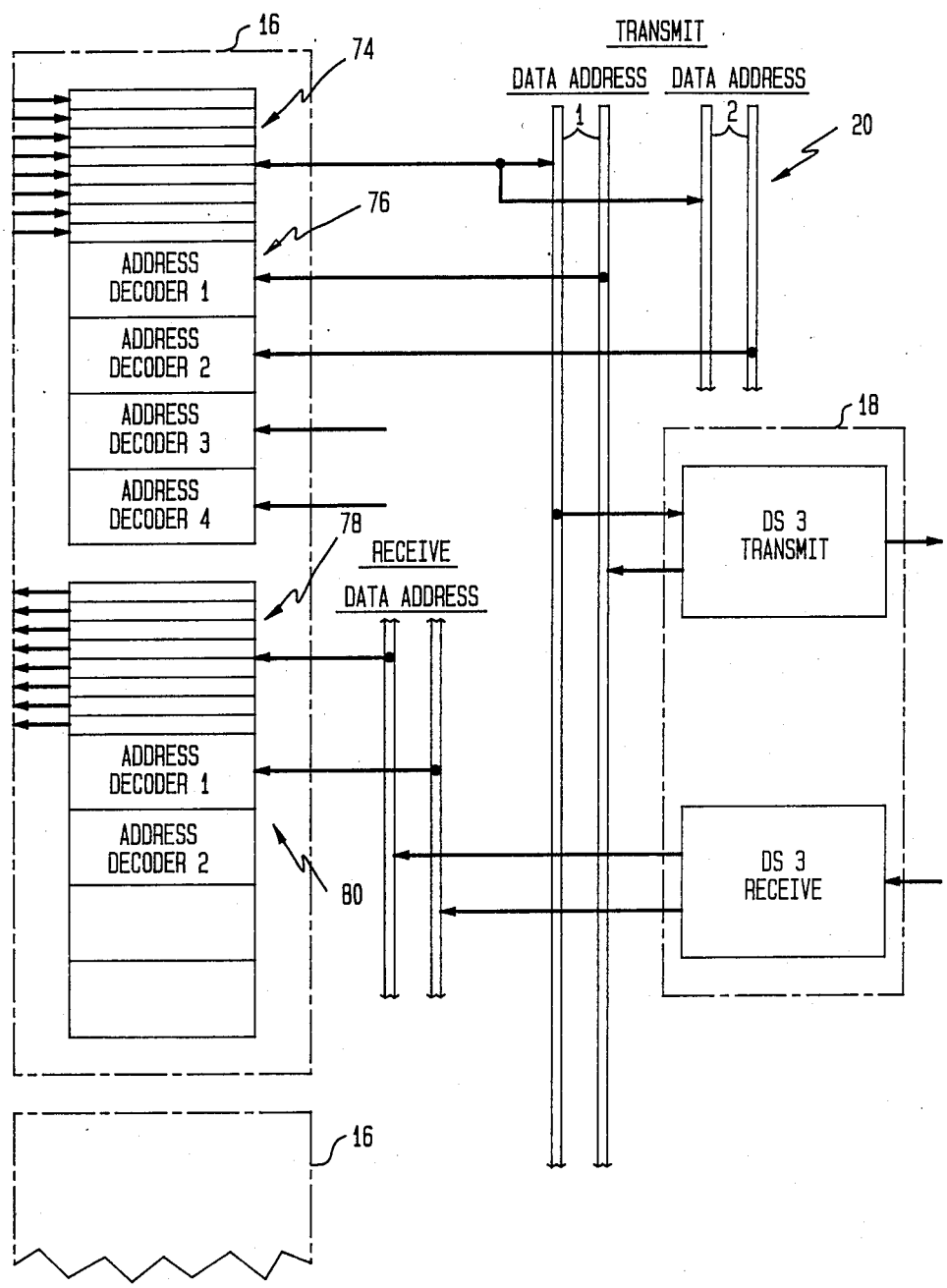
FIG. 5 is a schematic block diagram illustrating how the low speed and high speed modules in the apparatus of FIG. 2 are connected to separate bus line sets.

FIG. 5 is a functional block diagram illustrating how the low speed modules 16 and high speed modules 18 are interconnected via the bus system 20. As mentioned previously, there are four separate transmit buses, each having data and address lines, and four separate receive buses, each having data and address lines. Each high speed module is connected to one transmit bus (both data and address lines) and one receive bus (both data and address line). Each low speed module, on the other hand, is connected to all the transmit buses and all the receive buses. Samples received from a DS1 line are supplied to respective buffer registers 74 from which they are supplied to the transmit data bus lines at the proper times as selected by addresses received by the address decoders 76. Similarly, samples received from the high speed module 18 are latched into selected buffer registers 78 of the low speed module in response to addresses received by the address decoders 80.

Figure 6B:
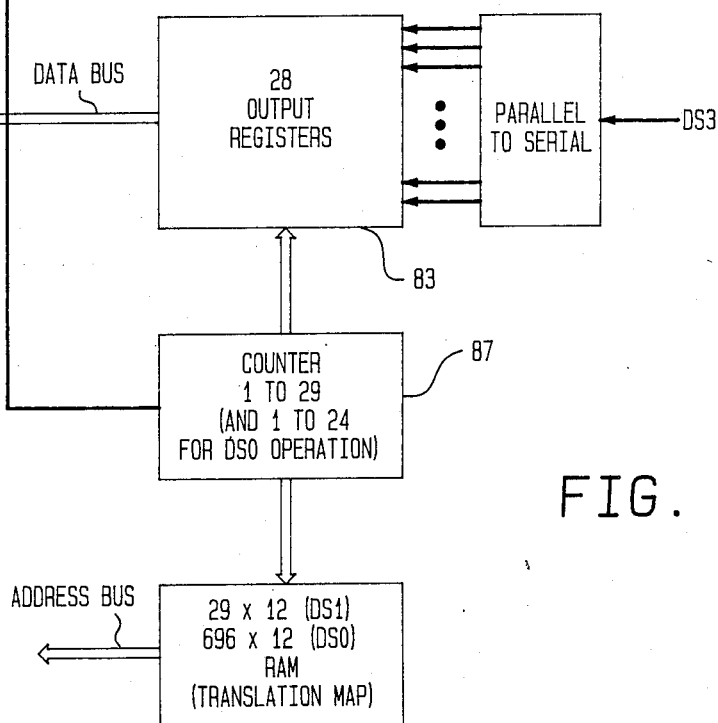
Figure 7:
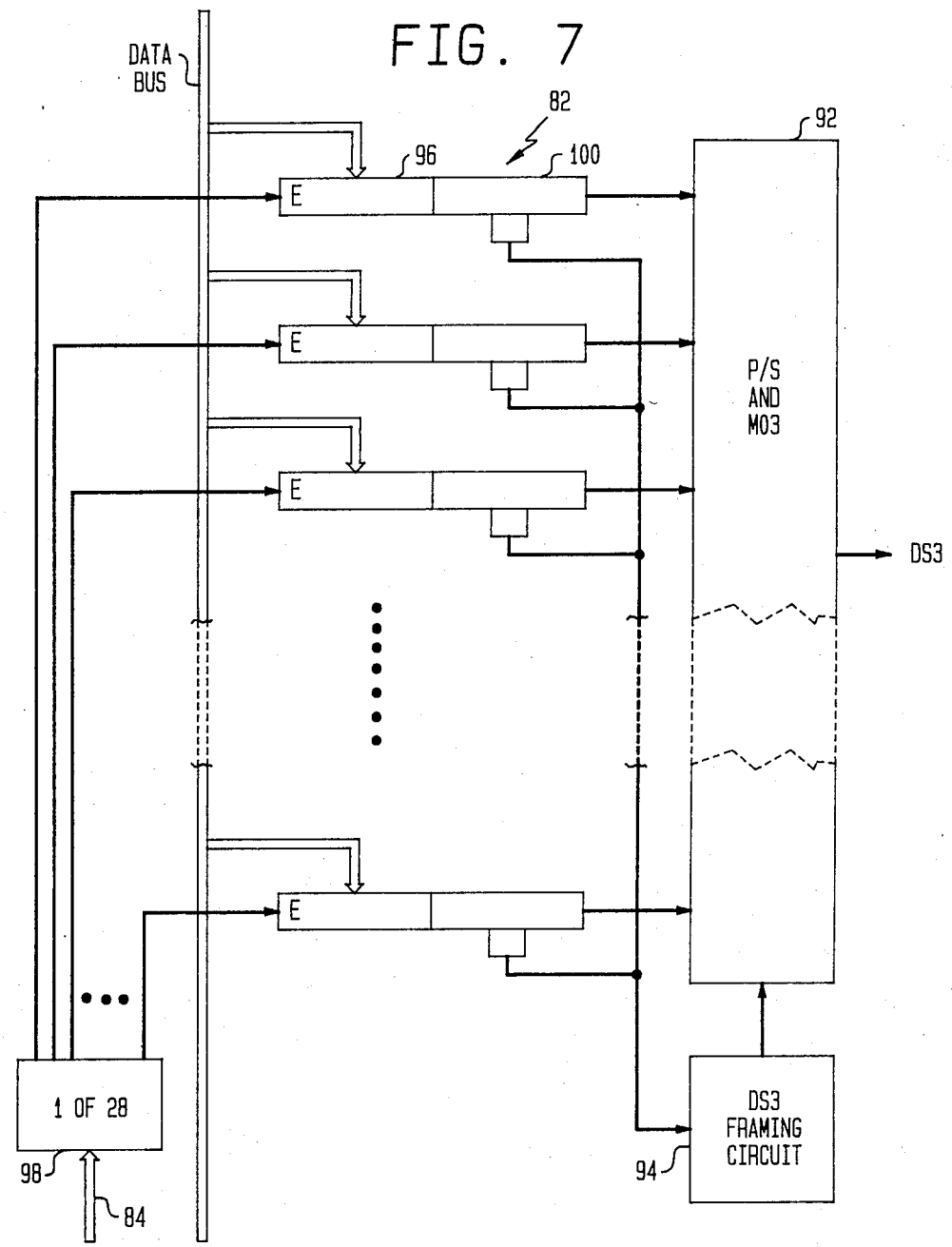
FIG. 7 is a schematic block diagram further illustrating the operation of the high speed module in FIGS. 6A and 6B.

FIGS. 6 and 7 illustrate the operation of the high speed modules in greater detail. FIG. 6A shows how data is passed from the data bus to the outgoing branch of the DS3 transmission line. FIG. 6B, which is nearly identical to FIG. 6A, shows how data is passed from the incoming branch of the DS3 line to the data bus.

Referring to FIG. 6A, it may be seen that digital samples, received from the data bus, are latched into successive ones of 28 input registers 82. The successive registers are selected by the 1 of 29 output 84 of a counter 86, one data sample not being latched into input register 82 but instead being latched into temporary storage registers 81 (shown in dashed lines). The counter 86 thus serves to successively select one of 28 DS1 lines for outgoing transmission on a DS3 transmission line (1 to 28 respectively) and, for DS0 operation, one of 24 DS0 channels from a DS1 transmission line (1 to 24). The 29th possible time slot selection is a means of accomplishing monitor, split and add/drop features via the termporary input/output storage registers 81. Counter 86 actuates one such register for time slot data transfer in one direction of transmission while counter 87 actuates the other for data transfer in the other direction of transmission. Output 84, in DS0 operation, counts from 1 to 29 for incoming DS1 samples and 1 to 24 for DSO channel samples in loading the registers 81 or 82. Another output 88 of counter 86 addresses a 29×12 RAM 90 (a 696×12 RAM 90 for DSO channel operation) which is programmed to contain 12-bit addresses at each of the 29 locations, (696 locations for DSO operation). When addressed, the RAM or translation map 90 supplies the selected address of DS1 line or DSO channel to the address bus of the bus system. DSO operation will be described in greater detail in the subsequent discussion of FIG. 11.

Each DS3 frame is created by a parallel-to-serial converter and multiplexer 92. As is more clearly shown in FIG. 7, this circuit 92 receives digital samples from all of the input registers 82 and stuffs successive samples into a DS3 frame with the aid of a DS3 frame circuit 94. Each of the input registers 82 comprises two sections: an input latch 96 which is enabled by a signal from a decoder 98, and an output latch 100 which holds the sample for acceptance by the parallel-to-serial converter 92. When all of the output latches 100 are filled, a signal is presented to the DS3 framing circuit 94 and the frame stuffing operation is initiated.

The portion of the high speed module which handles the incoming branch of the DS3 line, as shown in FIG. 6B, is substantially identical and operates in the reverse manner to the outgoing branch portion just described.

Figure 8A:
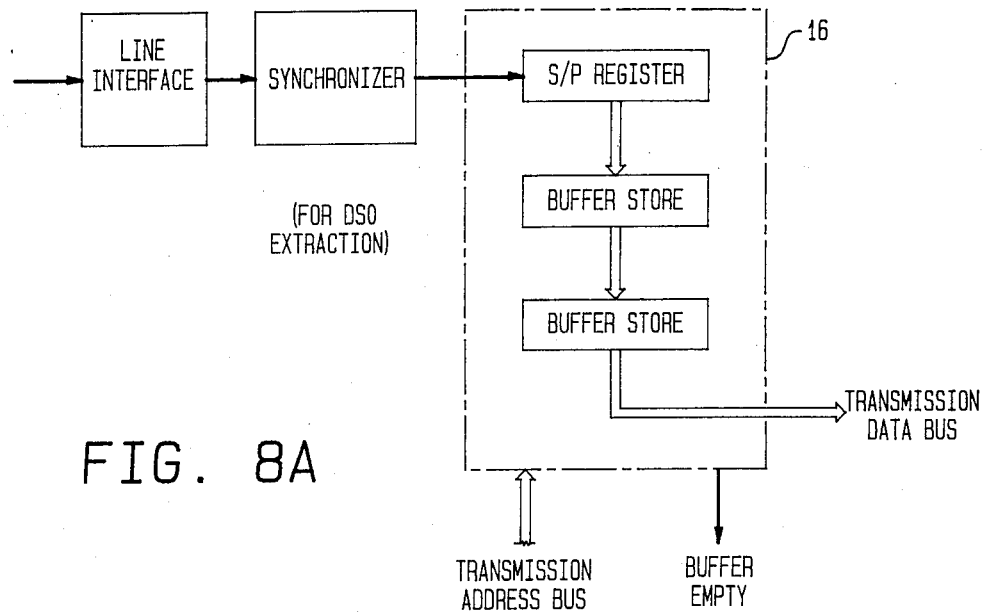
FIGS. 8A and 8B are block diagrams illustrating the operation of a low speed module.
Figure 8B:
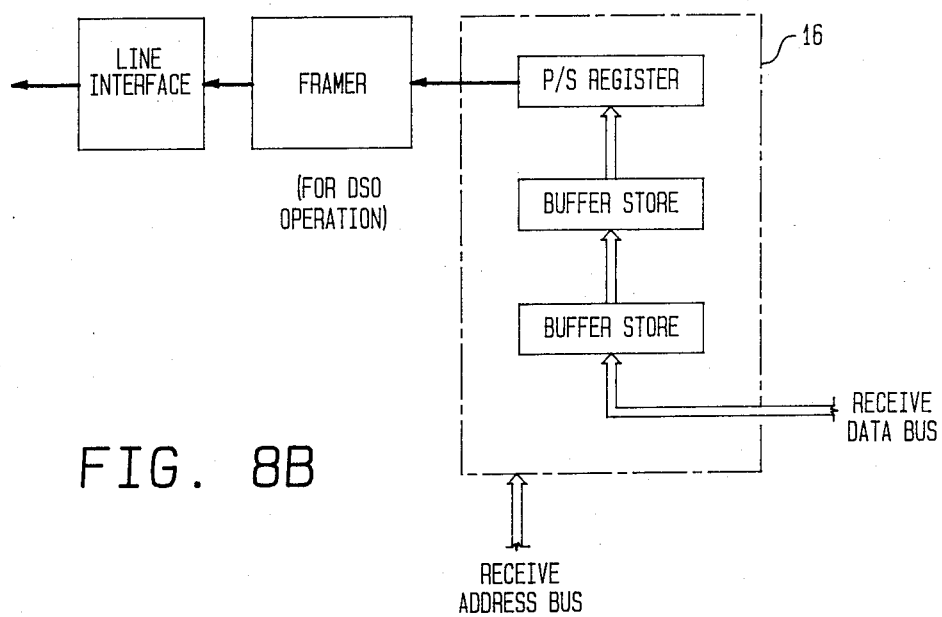

FIGS. 8A and 8B illustrate the operation of a low speed module 16. As shown in FIG. 8A, this module 16 receives an address via the transmission address bus. This will prompt the module to place an 8-bit digital sample on the transmission data bus. This sample is a parallel representation of the serial DS1 data that entered the module through the line interface. The synchronous circuit identifies the DS0 digital data samples within the DS1 signal, equivalent in fashion to the DS3 synchronizer shown in FIG. 7. Because the high speed module will present a transmission address more often than data samples are available from the low speed module, a "buffer empty" indicator will alert the high speed module to the validity of the data on the transmission data bus. The structure of the low speed module 16 is complementary in the receive direction, as shown in FIG. 8B; a "buffer full" signal is not required.

Figure 9:
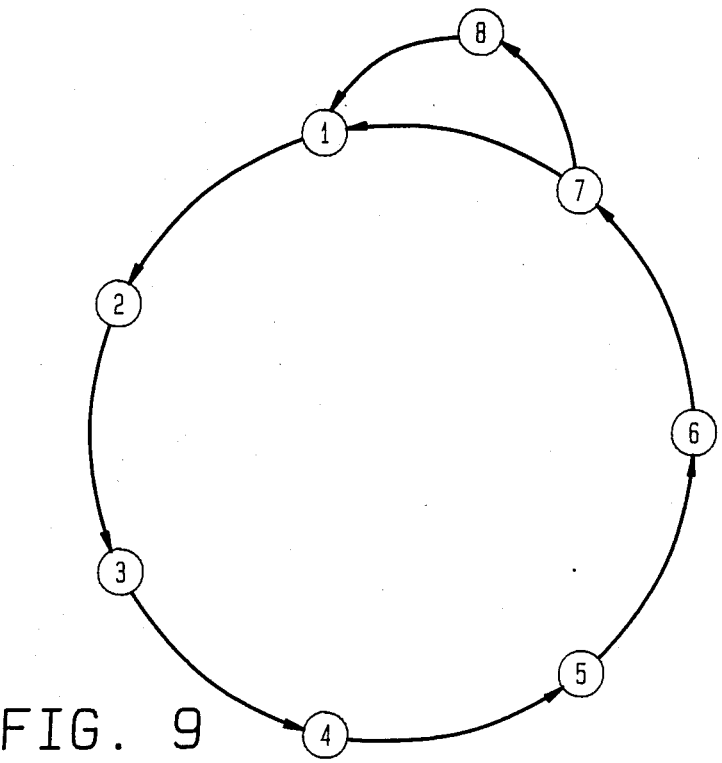
FIG. 9 is a state diagram illustrating the operation of the apparatus of FIGS. 6A and 7 at the first level of multiplexing.
Figure 10:
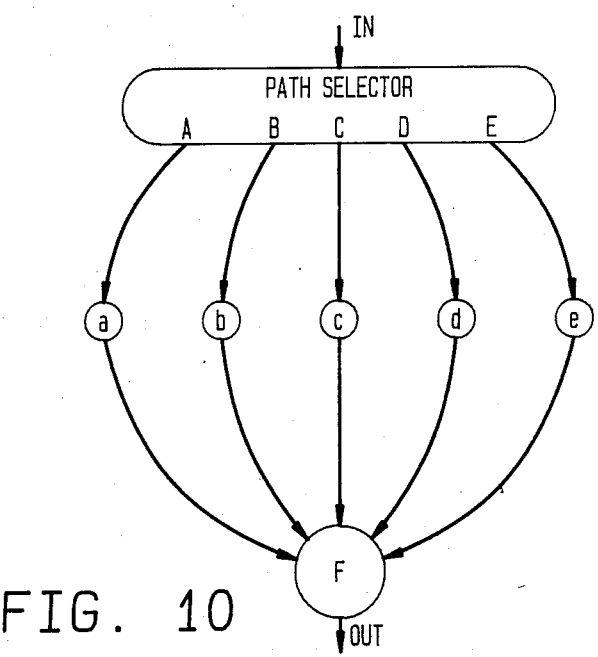
FIG. 10 is a state diagram illustrating the operation of the apparatus of FIGS. 6A and 7 at the second level of multiplexing.

FIGS. 9 and 10 are state diagrams that illustrate the operation of the apparatus according to the invention.

FIG. 9 shows the first level of multiplexing. In state 1 the apparatus "processes" (as explained below) DSI signals #1, 2, 3 and 4. The relationship between states and DSI signals in FIG. 9 is as follows:

| State | DS1 # |
|---|---|
| 1 | 1–4 |
| 2 | 5–8 |
| 3 | 9–12 |
| 4 | 13–16 |
| 5 | 17–20 |
| 6 | 21–24 |
| 7 | 25–28 |

Usually, the next state after state 7 will be state 1. A step number is assigned to each of the states, starting with step 1 for state 1. In other words, step 1=state 1, step 7=state 7, step 8=state 1, step 9=state 2, etc. After each 84 steps, the transition from state 7 will be to state 8. During this state, a control bit will be inserted into the DS3 serial bit stream.

Within each of the first 7 states, are the 5 sub-states a, b, c, d and e as shown in FIG. 10. When a state (1–7) is entered one of 5 paths will be selected (AF thru EF). The first time the state is entered, the selected path will be AF, which leads to sub-state a. If the state were for example #4, then sub-states a, b, c and d would correspond with DSI signal #13, 14, 15 and 16 respectively. In sub-state a, a bit from DSI signal #13 would be inserted into the DS3 serial bit stream. After this bit has been inserted, the state will be left, to continue to state #5. The next time state 4 is then entered, the selected path will be BF. On the third entry CF is selected, on the fourth DF, and on the fifth AF is returned to. This pattern is followed until the 49th entry, when EF is selected and a control bit is inserted into the DS3 serial bit stream. This pattern will be followed continuously with the following exceptions:

During entry 246, 541, 836 and 1131 (paths AF, BF, CF and DF respectively) "stuffing" bits are inserted into the DS3 serial bit stream. A "stuffing" bit is a normal DS1 bit, but if the incoming DS1 is too slow to fill the available slot in the DS3 serial bit stream, the slot is left empty. The absence of a valid bit is indicated by the control bit inserted in a sub-state e.

A similar stuffing process occurs in the procedure represented in FIG. 9. Here a stuffing bit is inserted during states 1, 2, 3, 4, 5, 6 or 7 during steps 596, 1277, 1958, 2639, 3320, 4001 and 4682 respectively.

The maximum entry number is 1176. The maximum step number is 4760. After these entry and step numbers the entry and step counters are reset and the next entry or step is counted as step number 1.

Figure 11:
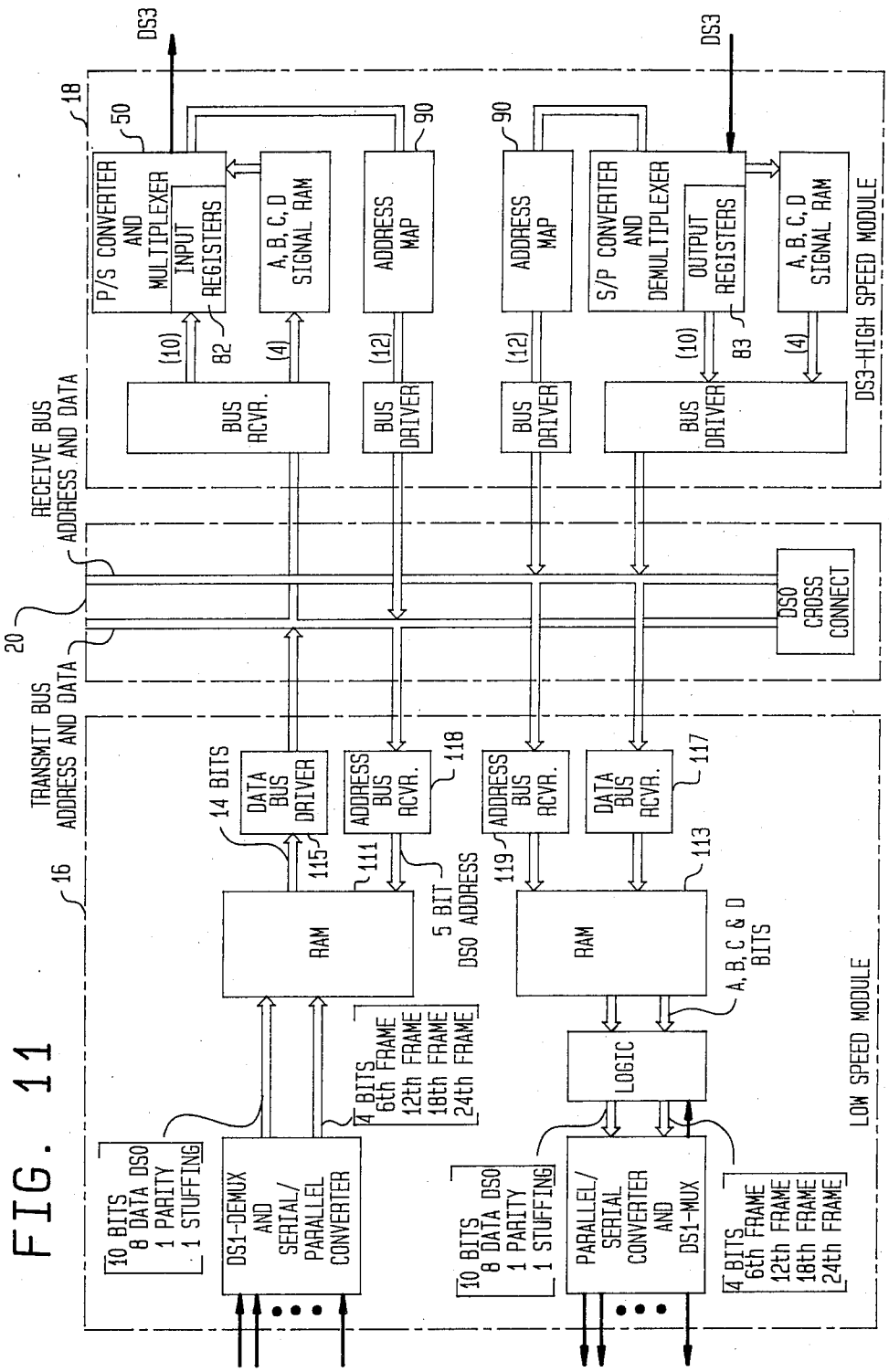
FIG. 11 is a schematic block diagram showing a DSO cross-connect equipped low speed module, the bus system and a DS3 high speed module for exemplifying the DSO cross-connect capability of the present invention.

As was introduced in the discussion of FIGS. 6A and 6B, the previously described embodiment is applicable for DS0/DS0 channel cross-connect capability. In particular, FIG. 11 is a block schematic diagram showing, at its left, a portion of a particular low speed module 16 having DS0 channel cross-connect capability. In the center of FIG. 11 is the cross-connect bus system 20 as previously discussed. On the right is one preferred embodiment of a DS3 high speed module 18 that has been previously discussed in the description of FIGS. 6A and 6B and having input registers 82 and output registers 83 for storing 672 DS0 channel data samples. Refer also to FIG. 6 for particular detail as to the structure of the required registers, sequential counter and their relation to the address map 90.

It is seen that to permit DS0 channel cross-connect capability, the previously discussed low speed module 16 now may comprise in combination in the transmit direction toward the bus system (a) 8 DS1 demultiplexers and serial-to-parallel converters of which only one is shown (b) a random access memory 111, in addition to the previously suggested buffer register, having sufficient elastic store capacity to store samples of all demultiplexed DS0 channels of all 8 DS1 demultiplexers or terminals (c) a data bus interface or data bus driver 115 and (d) an address bus receiver 118. In the receive direction from the bus system, the DS0 cross-connect equipped low speed module 16 comprises in combination (a) an address bus receiver 119, as well as, (b) a data bus receiver 117, (c) a buffer random access memory 113 for receiving samples or data bytes from the bus, (d) framing logic circuits and (e) eight parallel/serial converters and DS1 multiplexers of which one is shown.

Separate hypothetical situations will now be discussed in detail to illustrate the principles of the present invention. Firstly will be discussed the addressing of a particular DS0 channel in the low speed module in such a way that it is configured to be cross-connected and multiplexed into a particular channel slot in a DS3 high speed module hierarchical output. Then, there will be discussed the DS0 channel reception off a DS1 line being retransmitted to an outgoing DS0 channel in the same DS1 group or another DS1 group, it being assumed that the depicted DS1 transmit and receive multiplexer/demultiplexer combination is associated with the same DS1 digital carrier line.

In the DS0/DS3 illustration, the DS3 high speed module has stored in its address map 90 an address associated with a particular (for example 1 of 24) DS0 channel in a particular DS1 low speed group of a DS0 low speed module i.e. the one shown. Also the DS3 high speed module is pre-programmed to deliver data from input registers 82 so that the DS0 channel to be addressed at a particular time slot is destined for a particular DS0 data slot for DS3 output.

As the sequential counter shown in FIG. 6A runs through the channels and coincident addresses of the DS3 output group, it will eventually count to the address in address map random access memory 90 of the preselected DS0 channel of the depicted DS1 group. The 12 bit address is in substantial part gated on to the transmit bus line by a bus driver. While it is transmitted to all modules, only one preselected DS0 low speed module gates in the transmitted address which is received by the address bus receiver 118. Firstly, 4 bits select one of 16 low speed modules performed via an individual module select line (not shown). A particular (1 of 8) DS1 collection of 24 DS0 channels is identified by 3 bits of gated information and another 5 bits are employed to select one DS0 channel of a particular 24 DS0 channel group.

In the meantime, from the DS1 line, a serial data stream is broken up into its 24 component 8 bit samples through the action of the DS1 demultiplexer component. The serial-to-parallel converter converts the input serial data stream into the 24 parallel eight bit samples and add a parity and a stuffing bit which are all temporarily stored in sequential address locations in random access memory 111. At the same time as the serial data stream is broken down, 4 bits which may be designated Sa, Sb, Sc and Sd indicating the 6th, 12th, 18th and 24th frames of data are transmitted to random access memory 111 for an extended frame operation. Altogether, the parallel data transmission for a particular DS0 channel may comprise 14 bits: 8 bits representing the 8 bit DS0 sample; 4 signaling frame indicator bits Sa, Sb, Sc and Sd; 1 parity bit; and 1 stuffing bit.

When addressed, a particular DS0 memory location transmits the 14 bits for frame format to the bus interface circuit or data bus driver 115 in parallel.

Altogether then, a data random access memory 111, 113 for a DS0 low speed module capable of re-routing 8×24=192 8 bit samples will have a memory capacity of 192×14 for extended frame operation. A larger or smaller memory would be appropriate, of course, if more or fewer DS1 lines are terminated.

The data bus driver 115 outputs 14 data bits which are gated into the transmitting DS3 because the data is expected at that particular time slot on the transmit bus. When the bus receiver of the DS3 high speed module receives the 14 parallel bits, the ten bits of data including parity and stuffing bits are provided through input registers 82 in parallel to the parallel-to-serial converter and on to the multiplexer in serial from, while the A, B, C, and D signaling bits are extracted and provided to an A, B, C, and D signaling RAM for temporary storage for outputting in the 6th, 12th, 18th and 24th frames of serial data transmission.

Serial data received off the DS3 line is received by the demultiplexer of the DS3 high speed module. A serial-to-parallel converter extracts the 8 bit sample and provides the eight bits plus parity and stuffing bits through output registers 83 to a bus driver. The A, B, C and D signaling data bits of the 6th, 12th, 18th, and 24th frames are provided to an A, B, C, and D signal RAM data location for temporary storage. The bus driver provides the combined 14 bit signal in parallel to the receive bus line of the bus system.

A 12 bit address is transmitted on the receive bus and on the previously described individual module select line simultaneously with the 14 bits of data which are received by address bus receiver 119 and data bus receiver 117 of the receiving DS0 low speed module respectively. The address data identifies particularly what DS0 channel of the DS1 line the data is destined for. The data is loaded into that particularly addressed memory location of random access memory 113.

Out of random access memory 113 come the ten bits of data and the A, B, C, and D signaling bits in parallel when the sequential continuous counter of the low speed module reaches that address. They are first provided to framing logic circuits which are controlled by the operation of the DS1 multiplexer. The multiplexer signals the logic circuitry when the A, B, C, and D signaling bits are to be inserted in the 6th, 12, 18th to 24th frames of serial data output of the parallel-to-serial converter. At last, the DS0 data sample is provided in the preselected 1 of 24 DS0 channel output of the DS1 multiplexer.

Thus, there has been illustrated a means of terminating, for example, DS0 channel 8 of 24 channels in a particular DS1 group in a DS0 low speed module. Data from that channel is, in this illustrative example, cross-connected and multiplexed, for example, to DS0 channel 97 of 672 channels of a particular DS3 channel group of a high speed module. Now will be described the cross-connection at the DS0 level in such a manner that a cross-connect within the same or another DS1 group can be achieved. In other words, channel 8 of 24 in the depicted DS1 group can be connected to channel 3 of 24 of the same or another DS1 group. It is important to recognize that control of the process remains with a DS3 high speed group module. The destination channels in the direction of channel 3 toward channel 8 and vice versa are controlled by the 12 bit addresses transmitted by the DS3 high speed group module. A 12 bit address transmitted in a particular time slot on the transmit bus line identifies that the channel 8 data is destined for channel 3. Similarly, the data of a particular time slot identified to channel 3 is loaded into channel 8 by the operation of the address bus receiver 119 of the low speed module 16 by the 12 bit destination address received off the receive bus. For transmission between channels in the same low speed group, data may be maintained in the temporary input/output registers 81 while two address cycles of DS3 control are employed to effectuate the identification of data transmission from DS0 to DS0 channel on the DS1 side of the bus. For transmission between different low speed groups, data is moved across the data bus to the DS3 side, stored in registers 81 shown in FIGS. 6A and 6B and returned to the DS1 side in two address/data transfer cycles.

With the embodiment of FIG. 11, the following features may be implemented under the control of the DS3 high speed module in accordance with the above discussion: a so-called monitor function, a so-called split function, and a so-called add/drop function. In particular, in the monitor function, any one of the 29 transmit and receive DS1 (24 channel) time slots on either the transmit or receive data bus including the one held in temporary registers 81 are routable to any predetermined low speed module for monitoring, test or other purposes. In the split function, a signal coming from any low speed DS1 module can be inserted into any one of the 29 DS1 24 channel line time slots. In the add/drop function, DS1 data from a serial to parallel converter of the high speed module may be routed directly to a parallel to serial converter. Furthermore in add/drop, low speed DS1 data may be dropped or inserted continuously from the termporary registers into the high speed data stream in the high speed module. The sequence of all data transfer is determined by the address or sequence map cycle of allocated cross-connect functions in DS3 high speed module address map memory 90.

Figure 12:
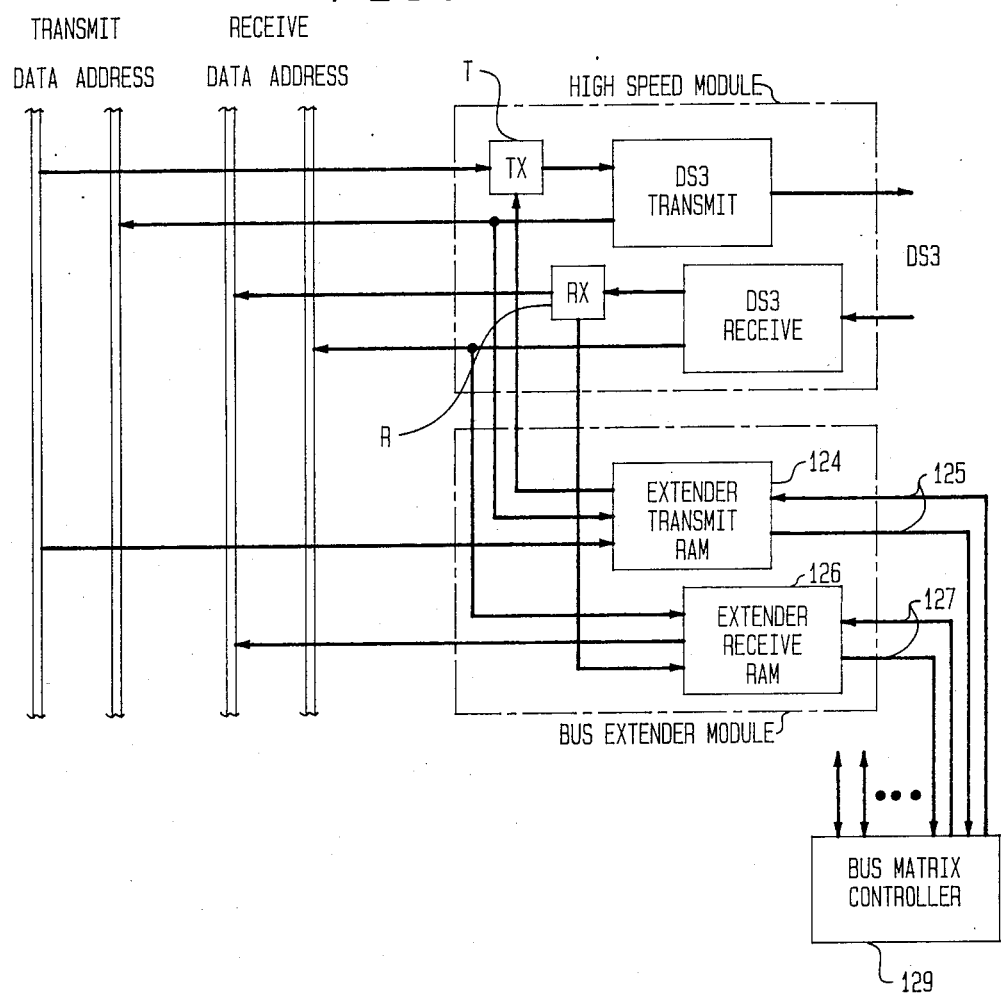
FIG. 12 is a schematic block diagram of a bus extender module for extending the capabilities of the present system.
Figure 13:
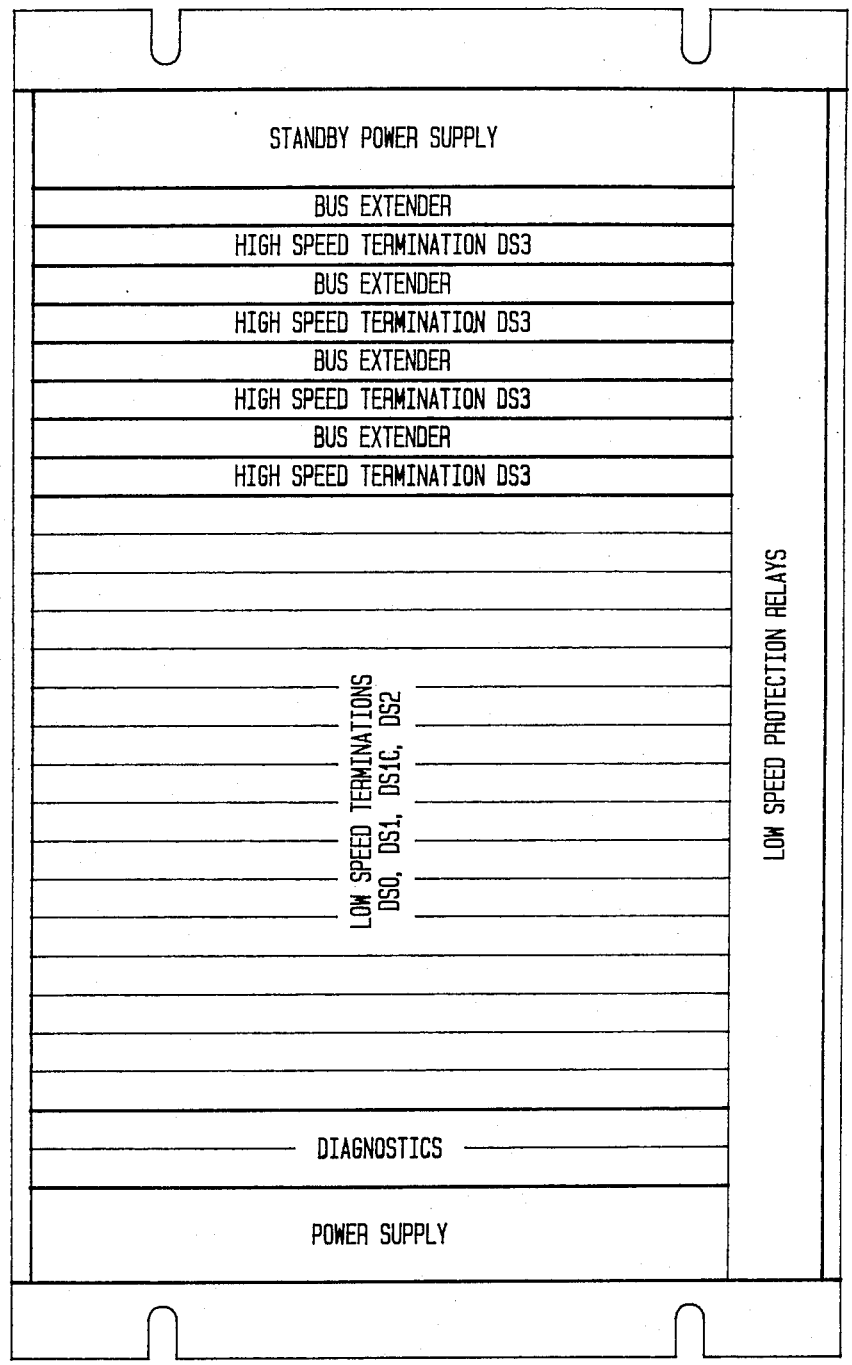
FIG. 13 is a suggested hardware drawing of the present apparatus showing its modular construction.

Referring to FIGS. 12 and 13, it is suggested further that the present invention be modularized. Each of the particular components or building blocks may be implemented by means of CMOS technology. For example, a DS1 low speed module without DSO/DSO capability may be built from just two integrated circuit chips for each 24 channel system: one for parallel/serial and serial/parallel conversion, the other for coder/decoder functions and monitoring. The DS3 high speed module may be comprised of two more basic building block chips while a DSO/DSO low speed module may require a different design but may be built from a similar pair of chip building blocks. Furthermore, referring to FIG. 13 showing a modular housing for the present apparatus, each high or low speed module may plug into a bus (not shown, but implicity in the rear of the housing) via an edge connector while the bus system may be designed with an auxiliary extension bus comprising auxiliary or extra slots for other modules on the high speed side. It is assumed that both the address and data, transmit and receive buses, are extended to these slots. The housing also comprises normal and standby power supplies. Diagnostic control circuit board slots are also provided in the housing. In the auxiliary slots may be plugged, for example, a bus extender module associated with each high speed module, one of which is depicted in FIG. 12.

The bus extender module simply comprises sufficient random access memory 124, 126 to permit storage of data for two directions of transmission of a DS3 high speed group, in other words first and second data memories 124, 126 for storing 672 DS0 channel data samples for each direction of transmission in each memory. Furthermore, the bus extender module is addressable directly by one of the four DS3 high speed modules that are contained within one system, as shown. Furthermore, the bus extender module extends the bus to a second bus extender module plug-in slot of another bus of another cross-connect/multiplex system similar to the one described either through a bus controller and swithch matrix 129 or via direct connection. Conductor 125, 127 may be used to complete the connection. In this way, the capacity of the described system may be greatly expanded and its features similarly enhanced. In particular, the bus extender module comprises data and address bus access as well as control lead access from the controlling DS3 high speed module. Four bus extender modules are shown in FIG. 13 which may be used for the four DS3 high speed modules or 3 modules and a standby. In place of bus matrix and controller 129, direct distributed control may be provided in each bus extender module, the bus extender modules being connected together in a star configuration and inherently provided with switching capability.

Referring to FIG. 12, normally in non-extended operation, data from the transmit data bus is passed through transmitter T to the DS3 transmit for output. DS3 receive data is passed through DS3 receiver R to the receive data bus. Transmitter T or receiver R is an abreviated way to describe the bus reception, data storage, counting, etc. functions described in detail before.

In extended bus operation in the transmit direction, data from the transmit data bus and from a low speed module is gated into the extender transmit RAM 124 as well as being attempted into the high speed module. However, the high speed module is not involved since the true destination is another cross-connect multiplex apparatus. Bus matrix controller 129 transfers the data to that apparatus. When data is destined for DS3 high speed module output from the bus extender module, the data is passed by the bus extender transmit RAM 124 through a direct link to transmitter T of the high speed module and on to the DS3 transmit for output.

In extended bus operation in the receive direction, data received in the DS3 receive portion of the high speed module is normally passed through receiver R to the receive data bus but now proceeds through a direct link to the extender receive RAM 126 and on to bus matrix controller 129. Data received in the extender receive RAM 126 is output to the receive data bus, a low speed module having no need and being unable to distinguish the difference between this data and data coming from the high speed module receiver R.

There has been shown and described a novel apparatus for cross-connecting and multiplexing PCM channels which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

What is claimed is:

1. A low speed digital carrier line terminal module for interfacing a cross-connect apparatus for cross connecting low speed digital carrier lines to either low or high speed digital carrier lines wherein said high speed digital carrier lines include data rates that are non-multiples of data rates on said low speed lines and are asynchronous to each other; including
    a serial-to-parallel converter in the transmit direction toward the cross-connect apparatus for loading a random access memory, the cross-connect apparatus being a bus system over which bus system pulse code modulated carrier DS0 channel data is transmitted in parallel, the random access memory for temporary, elastic storage of data corresponding to a plurality of pulse code modulated DS0 channels prior to parallel data transmission through the cross-connect apparatus along with data transmitted by other low and high speed digital carrier line terminal modules, the capacity of the random access memory being related to the number of pulse code modulated carrier DS0 channels terminated by the low speed digital carrier line terminal module, and an address bus receiver for addressing the random access memory, actuating the parallel data transmission of the plurality of pulse code modulated DS0 channels through the cross connect apparatus; and a parallel-to-serial converter in the receive direction from the cross-connect apparatus, the parallel-to-serial converter for removing the pulse code modulated carrier DS0 channel data from a random access memory and providing a serial data stream to a multiplexer for transmission over an associated digital carrier line.

2. A low speed module as recited in claim 1, further including framing logic means in the receive direction from the cross-connect apparatus for inserting signaling bits in a data stream for outgoing transmission over a low speed carrier line.

3. A low speed digital carrier line terminal module for terminating a plurality of DS1 digital carrier lines; including
    a transmit bus interface circuit for providing a parallel data interface with a cross-connect transmit data bus line.
    a receive bus interface circuit for providing a parallel data interface with a cross-connect receive data bus line,
    the transmit and receive bus interface circuits each comprising a random access memory for temporary storage of data and each being addressed by an address bus receiver, each random access memory being responsive to address signals transmitted to the address bus receiver over an address bus by a high speed digital carrier line terminal module for terminating at least one DS3 digital carrier line a demultiplexer and a serial-to-parallel converter for loading the random access memory with data from the DS1 digital carrier lines such that a particular address of the memory comprises at least a data sample of a terminated DS0 channel at a particular time slot and wherein said high speed digital carrier line terminal includes means for coupling data from said DS1 lines asynchronously to said DS3 lines whereby the DS3 data includes data that is a non-multiple of the DS1 data.

4. A low speed module as recited in claim 3 wherein the receive bus interface circuit is further characterized by
    a multiplexer and a parallel-to-serial converter for accessing the random access memory data and for formatting the data for transmission over a predetermined DS0 channel of one DS1 digital carrier line determined by the address signaling of the high speed digital carrier line terminal module.

* * * * *